A. N. MARTIN.
PISTON.
APPLICATION FILED AUG. 22, 1919.

1,394,926.

Patented Oct. 25, 1921.

Inventor
Alfred N. Martin
By his Attorney

UNITED STATES PATENT OFFICE.

ALFRED N. MARTIN, OF NEW DORP, NEW YORK.

PISTON.

1,394,926.   Specification of Letters Patent.   Patented Oct. 25, 1921.

Application filed August 22, 1919. Serial No. 319,171.

*To all whom it may concern:*

Be it known that I, ALFRED N. MARTIN, a citizen of the United States, and resident of New Dorp, in the county of Richmond and State of New York, have invented certain new and useful Improvements in Pistons, of which the following is a specification.

Having in mind the objections attending the use of packing rings with the pistons of internal combustion cylinders, wherein, due to the angular thrust imparted by the swaying piston rods, uneven wear upon the cylinder walls causes them to become distorted from their true circular form, resulting in the loss of compression; and also wherein the scraping action of the rings upon the cylinder wall has the two-fold deleterious effect of removing lubricant from the working surfaces and of introducing the lubricant into the combustion chamber, thus increasing the difficulty of producing efficient and readily combustible gaseous mixtures; therefore my invention consists in the production of a piston without the usual forms of piston rings, but having its compression holding characteristics provided in a new and practical manner.

Briefly, my improvement may be said to comprehend the provision of a number of bands or sheets of spring-like metallic material, placed or wrapped in superposed surface relation around or about the peripheral wall of the piston, said bands or sheets having width sufficient to enable them to cover almost the entire length or depth of the piston, and said piston having upper and lower annular flanges to afford localizing means whereby the wrapped bands or sheets may be held against vertical displacement.

The joint forming, opposed free edges of the bands or sheets may be disposed at any desirable angle relatively to the piston axis, the gaps or joints of adjacent bands or sheets lying in different vertical regions about the piston, so that one band or sheet may seal the joint of another. Further, the outermost band or sheet may be of greater thickness than the others, as it, being in working relation with the cylinder wall, will be subject to wear.

Other features and advantages of my invention will hereinafter appear.

Figure 1:
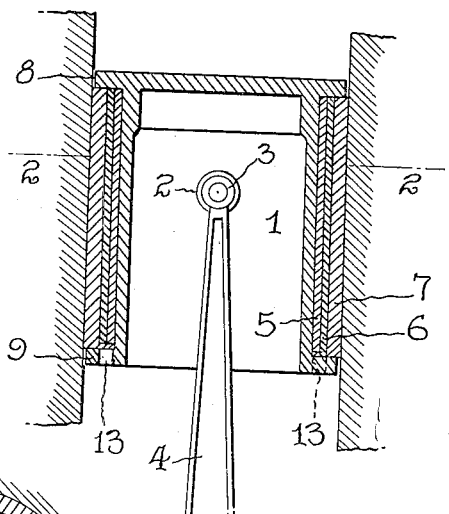
Figure 1 is a vertical sectional view of a piston embodying my improvements.

For descriptive purposes let 1 indicate a trunk piston suitable for use in the cylinders of internal combustion engines; one of the piston bosses 2 being shown in Fig. 1; also wrist pin 3, and the usual connecting rod 4.

Usually the piston is provided with grooves about its outer periphery to contain rings that bear outwardly against the wall of the cylinder in which the piston is working, but on account of the swaying action of the connecting rod, imparted thereto by the crank shaft, some angularity of thrust thus caused to be exerted by the piston has the effect of forcing the piston rings to hug more closely one side of the cylinder wall during the piston instrokes, and thus to scrape lubricating oil from the cylinder wall and deliver it into the combustion chamber,—with the well appreciated disastrous influence upon the combustible character of the gaseous mixture to be exploded.

Therefore my invention consists in the provision of one or more bands or sheets of spring-like metallic material having substantially cylindrical contour and placed around the outer peripheral surface of the piston and covering almost the entire length thereof.

In the present example I have illustrated three of these bands or sheets, which I will term sleeves, they being indicated in Fig. 1 respectively at 5, 6, and 7, and the outer sleeve, 7, being represented as of greater thickness than sleeves 5 and 6 because it offers a working surface of the cylinder wall and is therefore more subject to wear.

Obviously I am not limited to the use of three sleeves nor to any particular number thereof; the number of sleeves being optional, and determinable according to the piston design and the size and load requirements of the engine.

The piston is provided at its opposite ends with localizing means for the sleeves, examples whereof are here shown as annular shoulders or flanges 8, 9, to restrain the sleeves for longitudinal movement relatively to the piston. These shoulders, or annuli, represent the extreme diameter of the piston, and are intended to have the usual working clearance in their relation to the cylinder.

The sleeves however, which are each divided lengthwise, as by a lap joint 10, fit in their nested relation upon the piston, and, at the outer peripheral surface of the external sleeve, bear with snug slidable contact against the cylinder wall, due to the radial expansion the sleeves are enabled to exert, thereby affording close slidable fitting relation between the piston and the cylinder over substantially the entire length of the piston.

By reason of this lengthwise extended bearing relation established between piston and cylinder, the otherwise disadvantageous effect of angular thrust is entirely neutralized; and, with my improved piston, cylinder compression is maintained at the maximum, while little or no opportunity exists for the introduction of lubricating oil into the combustion chamber.

To more completely secure the sleeves upon the cylinder the outer sleeve 7 may be provided at its outer end with inturned lugs 11, adapted to lie upon the upper surface of the annular shoulder 9, and to be borne upon by the lower edge of the adjacent sleeve, as 6, which latter sleeve is thus supported thereby.

In order that the several sleeves may be prevented against independent rotation, one upon the other, and to keep the joints 10 in said sleeve separated or out of registry, I provide recesses, as 12, in the respective inner sleeves to receive the lugs 11 and thus to circumferentially localize the sleeves in their relative positions.

Also the annular shoulder 9 may be provided with vertical apertures, as 13, to serve as ducts for the admission of lubricating oil to the nested sleeves, that their contacting surfaces may be properly lubricated.

Figure 2:
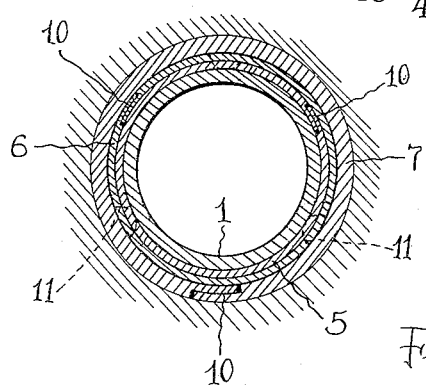
Fig. 2 is a section on the line 2—2 of Fig. 1.
Figure 3:
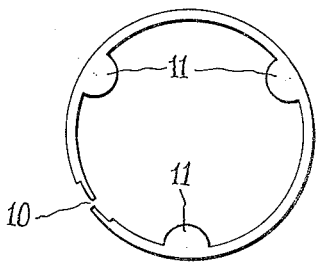
Fig. 3 is a bottom end view of a packing sleeve.
Figure 4:
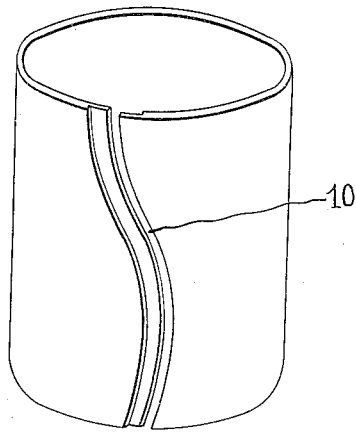
Fig. 4 is an enlarged perspective view of a packing sleeve.
Figure 5:
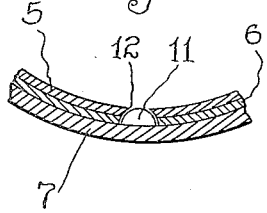
Fig. 5 is a detail section of the sleeve localizing means.

An example of gap or cleavage provided for the sleeves to render them expansible is shown in Fig. 4 where it is represented as following an angular or waved line instead of having vertical direction, the gaps of adjacent sleeves having opposite angularity. This angular or waved direction for the gap line is merely illustrative of my intention to avoid the alining or registering of gaps in two adjacent sleeves, which might possibly occur, although normally the relative arrangement of the nested sleeves will be such (see Fig. 2) that the gaps or joints occur in different radial positions, so that the gap in one sleeve is covered by the material of another sleeve.

Variations may be resorted to within the spirit and scope of my invention and parts thereof used without others.

I claim:—

1. The combination, with a trunk piston, of annular flanges extending respectively from its upper and lower ends, and packing comprising a number of spring-like divided metallic sleeves, in superposed relation around the piston to exert inherent radial tension therefrom, said sleeves inclosing substantially the entire length of said piston, and being restrained by said flanges from vertical movement relatively to said piston, the lower flange having vertical apertures therethrough for the passage of lubricant to said sleeves.

2. The combination, with a trunk piston, of annular flanges extending respectively from its upper and lower ends, and packing comprising a number of spring-like metallic sleeves, in superposed relation around the piston to exert inherent radial tension therefrom, said sleeves inclosing substantially the entire length of said piston, and being restrained by said flanges from vertical movement relatively to said piston, the outer sleeve having inturned lugs to co-act with the lower flange and the lower end of the adjacent sleeve.

Signed at the borough of Manhattan, in the city, county and State of New York, this 20th day of August A. D. 1919.

ALFRED N. MARTIN.